United States Patent Office 2,887,939
Patented May 26, 1959

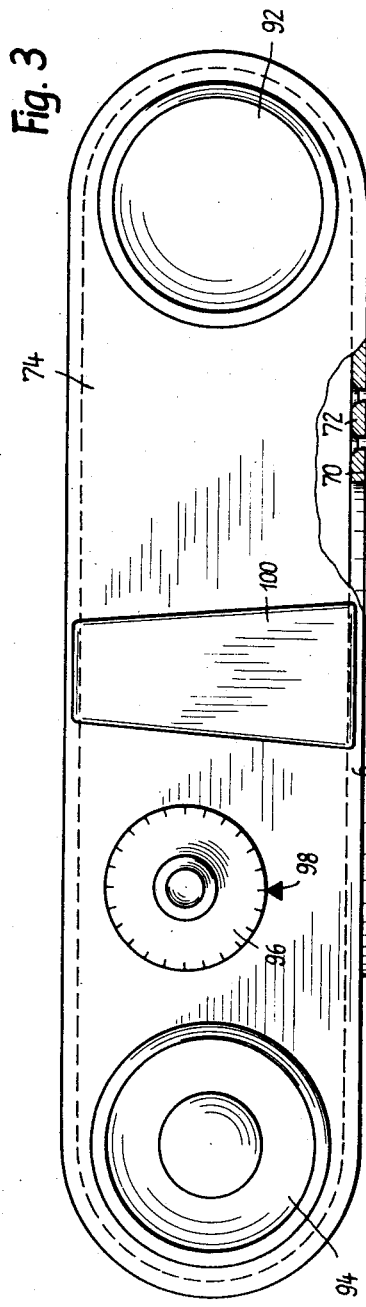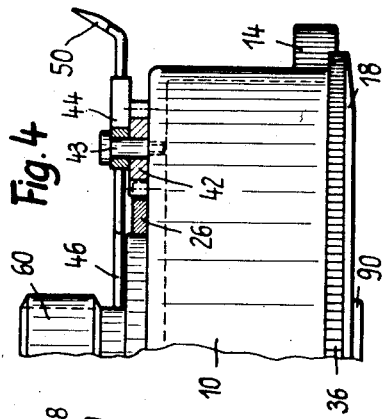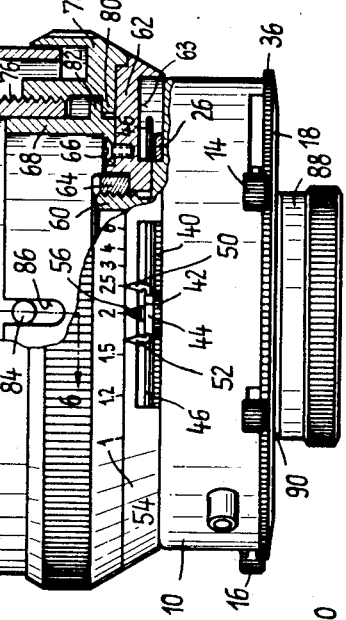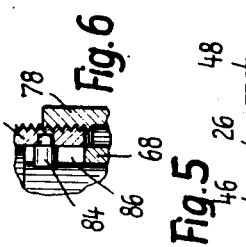

2,887,939

PHOTOGRAPHIC EXPOSURE CONTROLLING APPARATUS

Kurt Gebele and Paul Fahlenberg, Munich, Germany, assignors to Hans Deckel, Munich-Solln, and Friedrich Wilhelm Deckel, Garatshausen, Post Tutzing, Germany Application November 3, 1954, Serial No. 466,602

Claims priority, application Germany November 13, 1953

5 Claims. (Cl. 95—64)

This invention relates to photographic exposure controlling apparatus, and an object of the invention is the provision of generally improved and more satisfactory mechanism to enable the operator to set the photographic camera easily, quickly, and accurately for taking a photograph under any particular conditions.

Another object of the invention is to provide a photographic camera so designed that, for any given illumination of the subject, the camera may be made ready for exposure by consulting an exposure value scale, a focusing scale, and a shutter speed scale, without requiring reference to a diaphragm aperture scale, whereby the diaphragm aperture scale may be entirely omitted if desired, or may be consulted only infrequently or for special occasions, if such scale is present.

Still another object is to provide a photographic camera of the focusing type, having a focusing scale and also a depth of field indicator cooperating with the focusing scale, the depth of field indicator being operatively coupled to the diaphragm aperture adjusting means which in turn is coupled to the shutter speed adjusting means so that both the diaphragm aperture and the depth of field indicator are moved automatically when the shutter speed is changed.

A further object is to provide a photographic shutter and camera so designed and constructed that adjustment of the shutter speed control automatically adjusts the diaphragm aperture control in a complementary manner and at the same time operates a clear and conspicuous visual indication of the depth of field resulting from any given setting of the focus adjusting mechanism of the camera.

These and other desirable objects may be attained in the manner disclosed as an illustrative embodiment of the invention in the following description and in the accompanying drawings forming a part hereof, in which:

Fig. 3 is a top plan view, with parts broken away and parts in section, of a photographic camera and associated shutter, in accordance with the present invention;

Fig. 4 is a fragmentary view, with parts in section, illustrating a portion of the construction shown in Fig. 3, on a larger scale;

Fig. 5 is a fragmentary radial section taken substantially on the line 5—5 of Fig. 2, and Fig. 6 is a fragmentary radial section taken substantially on the line 6—6 of Fig. 3.

The same reference numerals throughout the several views indicate the same parts.

Figure 1:
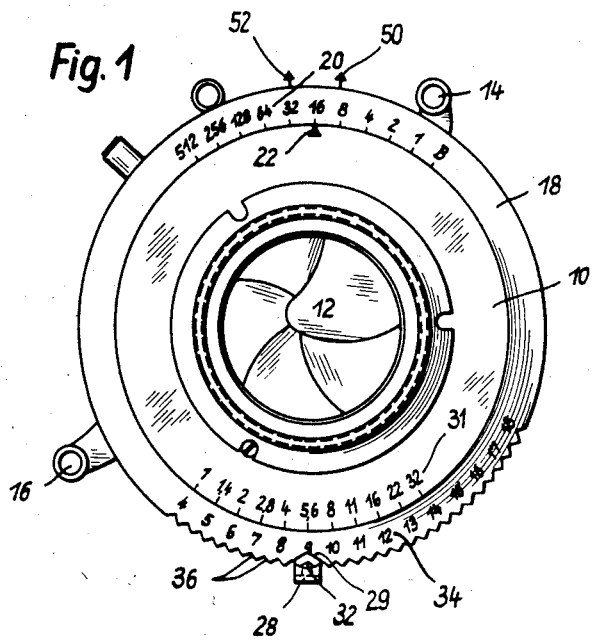
Fig. 1 is a front elevation of a photographic shutter in accordance with a preferred embodiment of the present invention.
Figure 2:
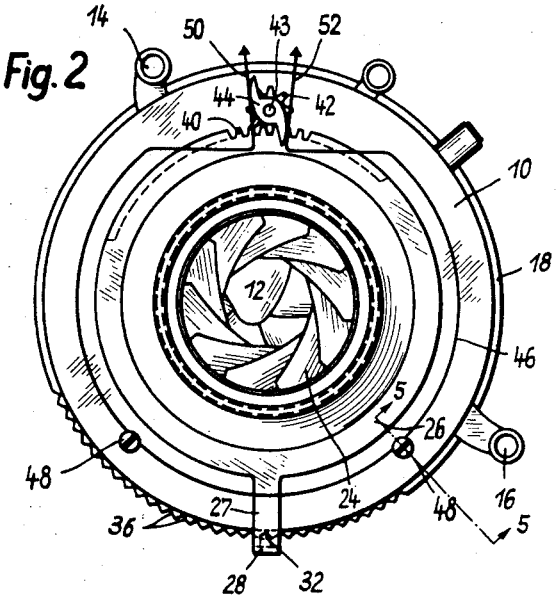
Fig. 2 is a rear elevation of the same.

According to the present invention the camera body itself may be any known kind or type of focusing camera body, as indicated diagrammatically or schematically in Fig. 3, and it may be equipped with any suitable shutter, as indicated diagrammatically or schematically in Figs. 1, 2, and 3. A shutter which (when slightly changed or modified as mentioned below) is suitable for the present invention, is the shutter currently available on the market under the trademark "Compur," manufactured by the Friedrich Deckel firm in Munich, Germany, such shutters being well known and widely distributed in the United States and elsewhere, for many years past. Typical details of such a shutter are disclosed in United States Patent 1,687,123, granted October 9, 1928, for an invention of Deckel and Geiger. While the present invention is shown, for the sake of an illustrative embodiment, in connection with a "Compur" shutter, it is not limited to this particular kind of shutter.

The shutter comprises a main casing or housing 10 of the usual annular form surrounding a central or axial opening through which light is admitted to the camera when an exposure is made, the opening being normally closed by the movable shutter blades 12 of any suitable number, five of which are shown in the drawings. The blades are driven rapidly to open position and then back to closed position, by the shutter operating mechanism within the annular casing, as shown for example in said Deckel and Geiger patent. The shutter is set or tensioned, ready for making an exposure, by moving the shutter tensioning or setting lever 14 to the right or in a clockwise direction when viewed as in Figs. 1 and 3, or to the left when viewed from the rear as in Fig. 2. The shutter trigger or release member is indicated at 16, and when this member is pressed downwardly, the driving mechanism of the shutter is unlatched or released in known manner, so as to open and then to close the shutter blades 12 at a variable speed depending upon the adjustment of the shutter speed setting or adjusting ring 18, rotatably mounted at the front of the camera and bearing a shutter speed scale 20 which is read in conjunction with a fixed index mark 22 on the stationary front plate of the camera casing or housing.

The shutter is equipped with the usual iris diaphragm, the blades of which are indicated diagrammatically at 24 in Fig. 2, the blades being adjustable to vary the size of the diaphragm aperture or "stop" by turning the diaphragm adjusting ring 26 rotatably mounted on the rear of the shutter housing. The diaphragm adjusting ring 26 has a radial arm or extension 27 which extends downwardly to a position below the lower edge of the shutter housing, and thence extends forwardly at 28 to form a resilient tongue portion provided with an upstanding pointed end 29 slightly overlapping the front face of the speed adjustment ring 18, and an upstanding pin 32 lying in the plane of the speed adjustment ring 18 and bearing resiliently against notches or serrations 36 formed in the periphery of the ring 18.

The pointed end 29 cooperates with the diaphragm aperture scale 31 marked on the stationary front plate of the shutter housing, and also cooperates with the exposure value scale 34 marked on the front face of the shutter speed adjusting ring 18 near the bottom thereof and approximately diametrically opposite to the speed scale 20. The aperture scale 31 is preferably graduated in the familiar f numbers, while the exposure value scale 34 is graduated in any arbitrary set of graduations or designations, for example the consecutive numbers from 4 to 18, inclusive, as shown in Fig. 1. Thus the position of the pointed end 29 with relation to the graduations of the aperture scale 31 shows the extent of opening of the diaphragm leaves or blades 24 at any given moment, in absolute terms of f number, while the position of the pointer 29 with respect to the exposure value scale 34 shows at any given moment the exposure value for which the shutter is set at that moment, which exposure value is the relationship between shutter speed and diaphragm aperture. Because of the resilient engagement of the pin 32 with the notches or serrations 36 on the speed adjustment ring 18, the diaphragm aperture adjusting ring 26 is resiliently coupled to the shutter speed ring 18 so that when the speed ring 18 is turned in one direction or the other to set the shutter for a different speed or exposure, the diaphragm aperture will simultaneously and automatically be adjusted in a complementary manner to compensate for the increase or decrease of shutter speed. But because the coupling is resilient rather than rigid, the members 28, 29, 32, may be forcibly moved, when desired, to a different position on the exposure value scale 34, to make the shutter ready for exposures under different illumination conditions, or using films of different speeds, or using filters which require that a filter factor be taken into account.

In some photographic shutters, when the speed adjusting member and the diaphragm aperture adjusting member are turned in the same direction, the exposure is, for example, made of longer duration, and the diaphragm is opened wider. The directions in which the parts move are capable of reversal within the skill of an experienced shutter designer. The present invention is to be used, of course, in a shutter in which there is a complementary relationship, rather than a non-complementary one, between the shutter speed adjusting ring and the diaphragm aperture adjusting ring, so that when both rings are turned in the same direction, an increase in the duration of exposure will be accompanied by a decrease in the size of the diaphragm aperture, or vice versa. Also, the present invention is used with a shutter in which the adjusting mechanisms are so calibrated (again within the skill of an experienced shutter designer) that both the shutter speed scale and the diaphragm aperture scale are graduated linearly according to a scale the values of which are arranged logarithmically or in a geometrical progression, or close enough to a true logarithmic scale so that the results will be sufficient for practical purposes. In other words, a given angular movement of the shutter speed scale 18 will, for example, double the duration of exposure (for instance, from 1/16 second to 1/8 second) and the same angular movement in the same direction of the diaphragm aperture member 28, 29 will close down the aperture just enough to compensate for the doubling of the exposure (for instance, from f/5.6 to f/8).

The periphery of the diaphragm adjusting ring 26 is provided, through part of its periphery, with gear teeth 40 which mesh with a pinion 42 mounted for rotation on a stationary pin 43 (Figs. 2 and 4) on the rear wall of the shutter housing 10. Fixed to this pinion to turn therewith is a double armed cam 44 located between a pair of resilient pointer arms 46 formed of resilient wire, for example, and anchored at suitable places on the rear wall of the shutter housing 10 by screw studs 48 (Figs. 2 and 5). The two arms which bear against the cam 44 may conveniently be formed integrally from a single length of resilient wire bent as seen in Fig. 2, and the extreme or free ends of the wire are bent angularly at 50 and 52 to provide pointers cooperating with the focusing scale 54 which is graduated on a beveled part of the camera focusing ring 78 and which is read in conjunction with a fixed focusing index 56 on a stationary ring 62. By turning the focusing ring 78, the camera is focused for objects at different distances from the camera, the focus distance being indicated by reading that point on the scale which is opposite the index mark 56. The scale may be graduated in any suitable unit, graduations in terms of meters being shown in Fig. 3, but of course other units such as feet can be used if desired. In the position shown in Fig. 3, the camera is focused for a distance of two meters.

The arms of the cam 44 are so designed with reference to the extent of rotary movement of the pinion 42, caused by rotation of the diaphragm setting ring 26, that these cam arms 44 will separate the resilient arms 46 (which normally tend to press together, toward the pin 43) to an extent proportional to the depth of field resulting from any given setting of the diaphragm aperture. Thus the pointed ends 50 and 52 of the resilient arms 46 may be read in conjunction with the focusing scale 54, to show the depth of field which will be in sharp focus for any particular setting of the focus mechanism. For example, at the setting shown in Fig. 3, the camera is focused for a nominal distance of two meters, and the pointer 50 shows that the farthest object which will be in sharp focus is at a distance of 2.5 meters, while the pointer 52 shows that the nearest object which will be in sharp focus is at a distance of 1.7 meters.

If the ring 78 is turned to focus the camera for a different distance, without changing the shutter speed or aperture setting, the pointers 50 and 52 will remain unchanged, but will be read in conjunction with different parts of the focusing scale 54. As the graduations of the focusing scale are spaced closer together with an increase in the focus distance, it is seen that a given separation of the depth of field pointers 50 and 52 will correctly indicate a greater depth of field when the camera is focused for a more distant object, and a lesser depth of field when the camera is focused for a nearer object. When the diaphragm aperture is reduced (either by turning the shutter speed ring 18 to make a slower exposure, or by separately moving the diaphragm adjusting member 28) the pinion 42 and cams 44 are turned to force the resilient arms 46 further apart, so that they will separate the pointers 50 and 52 further from each other, on the distance scale 54. Conversely, if the diaphragm aperture is increased, the resulting rotation of the pinion 42 and cams 44 will allow the arms 46 and the pointers 50 and 52 to move closer to each other, to indicate a decreased depth of field with reference to the focusing distance scale 54.

The manner in which the shutter is mounted on the camera body, and the manner in which the shutter and associated lenses are moved forwardly and backwardly for focusing, may be varied as desired, the details thereof being unimportant so far as the present invention is concerned. As one example of the way in which mounting and focusing may be accomplished, the usual rearwardly extending threaded tube 60 of the shutter may be surrounded by a plate 62 held stationary against the rear face of the shutter by a screw ring or nut 64 threaded tightly onto the external screw threads of the tube or flange 60. The front face of this plate 62 is annularly recessed at 63 to provide necessary clearance space for the diaphragm adjusting ring 26 and for the resilient indicator 46, and at the top of the plate 62 there is a slot or notch providing clearance space for the projecting ends 50 and 52 of the depth of field indicator, and for the arms of the cams 44.

A rearwardly extending annular flange or tubular member 68 is fixed to the rear face of the plate 62 by a series of screws 66. The flange 68 slides forwardly and backwardly snugly within a guiding flange or tube 70 which is riveted or otherwise firmly secured to the front wall 72 of the camera body 74. External threads 76 on the guiding tube 70 are engaged by a rotatable ring or nut 78 which, when turned, thus moves forwardly or backwardly in an axial direction along the tube 70. A radial flange 80 on the focusing ring 78 is engaged between the rear face of the plate 62 and the front face of a radial flange 82 on the tube 68, so that the ring 78 may turn relative to the parts 62 and 68, but its forward and backward motion is communicated to the parts 62 and 68, thus moving these parts 62 and 68, together with the entire shutter, forwardly and backwardly upon turning the focusing ring 78 in one direction or the other. A pin 84 (Figs. 3 and 6) fixed to the stationary tube 70 engages an axial slot 86 in the sliding tube 68, to prevent rotation of the tube 68 relative to the tube 70.

As already mentioned, the focusing scale or distance scale 54 is formed on a beveled part of the focusing ring or nut 78, and is read in conjunction with the fixed index mark 56 on a correspondingly beveled part of the plate 62, which plate 62 does not turn and thus it may be referred to broadly as a stationary plate relative to the focusing screw or nut 78, although the plate 62 together with the entire shutter does move bodily forwardly and backwardly during the focusing operation, without rotation.

The usual objective or lens assembly is mounted in the shutter in known manner, the rear component or components of the lens being mounted in the tube or flange 60 behind the shutter blades, while the front component or components of the lens are mounted in the mounting ring 88 screwed into the front lens tube 90 of the shutter.

Other details of the camera may be varied as desired. For example, if it is a roll film camera, or a camera of the type adapted to take 35 millimeter film in the usual cassette, the film supply may be located beneath the rewinding knob 92, and may be advanced when required by turning the film winding knob 94, the advancing movement of the film serving to turn a film counter or frame counter 96 which is read in conjunction with an index mark 98. A direct view finder 100 may be mounted on the top of the camera body.

In use, the operator may determine the proper exposure value either by using a light meter, or by visual inspection and estimate based on his experience. Of course film speed and filter factor are taken into account in determining the exposure value setting. Then the shutter is set for the proper exposure value, by moving the pointer 29 to the desired place along the exposure value scale 34.

Once the exposure value has been set, the operator may approach the rest of the setting procedure either from the standpoint of shutter speed, or from the standpoint of depth of field. For example, if a picture is to be taken of a fast moving object, as in the case of a race, shutter speed will probably be the determining factor, and so the speed setting ring 18 will be set to give an exposure of sufficiently short duration to "stop" the motion of the moving object. At the same time, the operator can quickly see at a glance, from the pointers 50 and 52, the depth of field which is available at the given shutter speed and given focusing distance.

On the other hand, when taking photographs of landscapes or other scenes with no fast moving objects, it is often the depth of field which is the critical factor, rather than the speed or duration of exposure. For example, it may be desired to show in sharp focus an object at a distance of six meters, while blurring an object at a distance of eight meters in order that the attention of a person viewing the picture will not be attracted to the latter object. In such a case, the operator would focus the camera for a distance of six meters, by turning the focusing ring 78 until the numeral 6 of the scale 54 is opposite the index mark 56. Then the shutter speed control ring 18 is turned in a direction to increase the speed of exposure, until the depth of field indicator 50 lies relatively close to the numeral 6 of the scale 54, and between the numeral 6 and the numeral 8 of this scale. Or again, if the operator does desire the object at eight meters to show clearly in the picture, as well as the main object at six meters, then the shutter speed ring 18 is turned for a slower exposure, with consequent decrease in the size of the diaphragm aperture, and increase in the depth of field, until the operator sees that the depth of field pointers 50 and 52 indicate a sufficient depth to include all of the objects which the operator wishes to appear sharply in the picture.

In this way, whether the operator is a beginner or a skilled and experienced photographer, he can approach the problem in either way, from the standpoint of depth of field being the important factor with time of exposure secondary, or from the standpoint of time of exposure being the important factor, with depth of field secondary. Once the exposure value has been properly set (the pointer 29 with relation to the scale 34) for the prevailing light conditions, the operator can easily and quickly observe the depth of field available for any given speed setting of the shutter, or the speed setting necessary to achieve any given depth of field at a particular focus distance. The manipulations can be carried out entirely without reference to the diaphragm aperture scale 31, so that this scale may be entirely omitted from the shutter if desired, although of course the scale may be retained on the shutter for occasional use by a photographer who is particularly interested in knowing the diaphragm aperture setting.

It may be emphasized at this point that the photographic camera construction art, at least with respect to construction of ordinary amateur cameras, has apparently proceeded in the past on the assumption that depth of field was independent of shutter speed. This has never been true except superficially and to a limited degree, but the falsity of this unfortunate assumption did not become apparent to any great extent so long as most photographic cameras had shutter speed adjusting means separately movable independently of the diaphragm aperture adjusting means. Now that satisfactory photographic equipment has become available (largely through the efforts of the present applicants and their associates) in which the shutter speed adjusting means is coupled to the diaphragm aperture adjusting means in various possible positions according to various light conditions or exposure values, a revision of preconceived notions is necessary and it becomes apparent that depth of field is not really independent of shutter speed but is dependent thereon to a great extent. For example, if one chooses a shutter speed which is so fast as to require a relatively great diaphragm aperture or stop, this reduces the depth of field to such an extent that one may not be able to get all the desired objects in the picture with sufficiently sharp focus. On the other hand, if one chooses a sufficiently large depth of field to include all the desired objects sharply in the picture, this may require such a small diaphragm aperture that the shutter would have to operate too slowly, especially if some of the objects to be photographed are moving rather than stationary. With these principles in mind it can be appreciated that the factors of shutter speed, diaphragm aperture, and depth of field are all mutually interrelated and dependent upon each other, for any given set of illumination conditions or exposure value. The present invention makes it possible, for the first time, for the photographer to obtain good pictures by the simple procedure of setting his camera first on the basis of the illumination value or integrated value, and then giving secondary consideration to the desired depth of field, and to the matter of shutter speed if there are moving objects in the scene to be photographed. No attention whatever need be paid to diaphragm aperture or stop size as an absolute value, since this is automatically taken care of (according to the present invention) if one sets the mechanism correctly according to the desired requirements of integrated exposure value, shutter speed, and depth of field.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

Reference is made to the co-pending United States patent application Serial No. 389,775, filed November 2, 1953, now Patent No. 2,829,574, in the name of Kurt Gebele (one of the joint applicants of the present application) for further disclosure of certain details of construction and operation of the present shutter, including ways in which the graduations of the exposure value scale and the coupling of the speed adjusting member to the aperture adjusting member may be varied. Certain subject-matter disclosed but not claimed in the present application is claimed in said co-pending application, now Patent 2,829,574, granted April 8, 1958.

What is claimed is:

1. A photographic camera including a body, a guide member mounted in stationary position on said body, a shutter mounting member movable forwardly and rearwardly along said guide member, a shutter including a housing secured to said mounting member, said shutter having an optical axis extending through said mounting member and guide member, a shutter speed adjusting ring mounted on said shutter housing for rotation about said axis, a shutter diaphragm adjusting member also mounted on said shutter housing for rotation about said axis, a camera focus adjusting member mounted for rotation about said axis and operatively connected both to said guide member and to said mounting member to move said mounting member along said guide member upon rotation of said focus adjusting member, a focus distance scale on said focus adjusting member, a resilient coupling between said speed adjusting ring and said diaphragm adjusting member to tend to move said diaphragm adjusting member upon movement of said speed adjusting ring, gear teeth on said diaphragm adjusting member, a pinion rotatably mounted on said shutter housing and meshing with said gear teeth to be turned thereby, a cam connected to said pinion to turn therewith, and a pair of resilient arms mounted on said shutter housing and having ends spaced from each other and lying adjacent said focus distance scale, said arms engaging said cam in position to be displaced by rotation of said cam to different distances away from each other and in directions along said focus distance scale, said cam being so shaped that the positions of said arms relative to said focus distance scale will indicate approximately the depth of field of the camera for any given position of said focus adjusting member and given position of said diaphragm adjusting member resulting from turning force applied either to said diaphragm adjusting member or to said speed adjusting ring while they are coupled to each other.

2. A photographic camera including a body, a guide member mounted in stationary position on said body, a shutter mounting member movable forwardly and rearwardly along said guide member, a shutter including a housing secured to said mounting member, said shutter having an optical axis extending through said mounting member and guide member, a shutter speed adjusting ring mounted on said shutter housing for rotation about said axis, a shutter diaphragm adjusting member also mounted on said shutter housing for rotation about said axis, a camera focus adjusting member mounted for rotation about said axis and operatively connected both to said guide member and to said mounting member to move said mounting member along said guide member upon rotation of said focus adjusting member, a focus distance scale on said focus adjusting member, a pair of resilient arms mounted on said shutter housing for movement along said focus distance scale, a cam operatively connected to said diaphragm adjusting member for moving said arms along said distance scale to positions indicating approximately the depth of field of the camera for various position of said diaphragm adjusting member and focus adjusting member, and means coupling said speed adjusting ring to said diaphragm adjusting member in any selected one of a series of positions of relative orientation, so that turning force applied to the former will cause turning of the latter and thereby turn said cam and move said resilient arms, said pair of resilient arms being formed as free ends of a single integral piece of resilient wire mounted on said shutter housing in substantially encircling relation to said optical axis.

3. In a photographic camera, a shutter comprising a casing having a stationary portion and an optical axis, a shutter speed adjusting member mounted on said casing for rotary movement about said axis as a center, a diaphragm aperture adjusting member also mounted on said casing for rotary movement about said axis as a center, said two adjusting members being so correlated to each other that turning movement of both members in the same direction and to the same angular extent will change the shutter speed and the diaphragm aperture to complementary extents, an exposure value scale carried by one of said members for indicating, in conjunction with the other member, the relationship of the two members to each other, a resilient coupling between the two members for turning one of them when the other is turned, a distance scale mounted on said camera for rotary movement relative to said casing, and depth of field indicating means moved relative to said distance scale by movement of either the shutter speed adjusting member or the diaphragm aperture adjusting member, said indicating means including a spring member secured to said casing and having a pair of arms movable by cam means actuated by movement of either said shutter or diaphragm aperture adjusting member, said cam means being actuated by a casing supported pinion gear cooperating with peripheral teeth on said diaphragm aperture adjusting member.

4. In a photographic camera, the combination of adjustable means including a distance scale for focusing the camera to different distances, diaphragm stop adjusting means rotatable about an optical axis for varying the exposure aperture, shutter speed adjusting means rotatable about the same optical axis, coupling means including a circumferentially extending series of notches on one of said adjusting means and a tooth on the other of said adjusting means for selectively engaging in a selected one of said notches for coupling said speed adjusting means to said stop adjusting means to move one in a manner substantially complementary to movement of the other, an exposure value scale for indicating the positions of relative orientation of said stop adjusting means and speed adjusting means with respect to each other, and means controlled by movement of either one of said speed adjusting means and said stop adjusting means, while they are coupled by said coupling means, for visually indicating on said distance scale the depth of field achieved by any given setting of said stop adjusting means and focusing means, whereby said depth of field indicating means will be moved by rotary movement of said shutter speed adjusting means, and whereby the operator may set the camera for making an exposure under variable conditions by observing said exposure value scale and observing the setting of said speed adjusting means and said depth of field indicating means, without necessarily observing the setting of said stop adjusting means.

5. A photographic shutter including a shutter speed setting member and a diaphragm aperture setting member both mounted for rotation and a focus distance scale, characterized by the combination with said setting members and scale of (a) releasable coupling means including a circumferentially extending series of notches on one of said setting members and a tooth on the other of said setting members for selectively engaging in a selected one of said notches for coupling said speed setting member and said aperture setting member to each other in any one of a series of positions of relative orientation with respect to each other, to turn with each other when coupled, (b) an exposure value scale operatively connected to one of said setting members and an index operatively connected to the other of said setting members and cooperating with said exposure value scale to indicate the position of relative orientation of one of said setting members with respect to the other, and (c) (c) depth of field indicating means sweeping over said focus distance scale and operatively connected to said aperture setting member to be moved thereby, so that when said aperture setting member and said speed setting member are coupled to turn together, rotation of said speed setting member will simultaneously alter the position of said depth of field indicating means and said aperture setting member.

References Cited in the file of this patent

UNITED STATES PATENTS

| | | |
|---|---|---|
| 1,174,014 | Clark et al. | Feb. 29, 1916 |
| 1,213,731 | Bornmann | Jan. 23, 1917 |
| 2,342,819 | Priesemann | Feb. 29, 1944 |

FOREIGN PATENTS

| | | |
|---|---|---|
| 139,562 | Austria | Nov. 26, 1934 |
| 655,518 | Germany | Jan. 20, 1938 |
| 666,365 | Germany | Oct. 18, 1938 |
| 1,028,877 | France | Mar. 4, 1953 |